United States Patent
Oertel et al.

(10) Patent No.: US 6,528,210 B1
(45) Date of Patent: Mar. 4, 2003

(54) ANODE DEGASSING PROCESS

(75) Inventors: Micah R. Oertel, Parma Heights, OH (US); Thomas N. Deighton, Avon, OH (US); Susan L. Peterson, Rocky River, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 168 days.

(21) Appl. No.: 09/675,761

(22) Filed: Sep. 29, 2000

(51) Int. Cl.$^7$ ................................ H01M 4/42
(52) U.S. Cl. .................... 429/229; 95/241; 95/266; 366/139
(58) Field of Search .................. 429/229; 95/241, 95/266; 366/139

(56) References Cited

U.S. PATENT DOCUMENTS 5,632,554 A  5/1997  Wang et al. ............... 366/208
5,632,603 A  * 5/1997  Taylor et al. ............. 429/229

FOREIGN PATENT DOCUMENTS

JP      10-106579   *  4/1998
SU      1109963     *  8/1984

* cited by examiner

*Primary Examiner*—Laura Weiner
(74) *Attorney, Agent, or Firm*—Stewart A. Fraser

(57) ABSTRACT

An anode degassing process for removing gas and densifying a slurry of anode mix. The process includes the steps of manufacturing an anode mix, aging the anode mix for at least thirty minutes following manufacture of the anode mix, disposing the aged anode mix into a degassing mixer, generating a vacuum in the degassing mixer, and agitating the anode mix by mixing in the presence of the vacuum so as to remove gas from the anode mix. The anode mix achieves a density of greater than 96 percent of the theoretical density.

10 Claims, 2 Drawing Sheets

ANODE DEGASSING PROCESS

BACKGROUND OF THE INVENTION

The present invention relates to the manufacture of an anode electrode mix for electrochemical cells, i.e., batteries, and more particularly to a degassing process for densifying an anode mix for use in batteries.

Alkaline electrochemical cells commonly employ a positive electrode, referred to as the cathode, and a negative electrode, referred to as the anode. The anode and cathode are disposed in a container and are separated by a separator. The anode, cathode, and separator simultaneously contact an alkaline electrolyte solution. The conventional anode is commonly formed as a gel-type slurry of anode mix typically comprising zinc powder as the active material. In addition, the anode mix typically includes potassium hydroxide (KOH), binder (gelling agent), and additives.

The anode is typically manufactured in bulk at an anode manufacturing station to produce a large batch, often referred to as an anode slurry. The anode ingredients, including the zinc powder, potassium hydroxide, gelling agent binder, and additives, are uniformly blended together in a blender under atmospheric pressure conditions to form the anode slurry. In the conventional battery assembly process, the blended anode slurry is transported to the battery manufacturing assembly line where a fixed amount by weight of anode is dispensed into each battery container.

During the anode blending process, it is generally common for air to become entrapped within the viscous anode slurry. In addition, when the zinc powder comes into contact with the potassium hydroxide solution, hydrogen gas is created due to zinc corrosion reaction, also referred to as zinc gassing. The hydrogen gas created during zinc gassing is also entrapped within the viscous anode slurry. The amount of hydrogen gas generated by zinc gassing is initially greater during the initial contact of zinc with potassium hydroxide, and then the amount of additional hydrogen gas generated by zinc gassing stabilizes and dissipates over time. The presence of entrapped air and hydrogen gas in the anode slurry generally reduces the conductivity of the anode. The entrapped gases also reduce the density of the anode which can cause processing problems, and limits the amount of active electrochemical materials that can be placed in the cell. The commercially available anode slurries produced in conventional manufacturing facilities typically have a density that is in the range of about 94 to 96 percent of the theoretical density of the anode.

One approach to minimizing the presence of hydrogen gas in the anode slurry is disclosed in U.S. Pat. No. 5,632,554, which employs a flexible bag for mixing the anode components to prevent contact of the anode components with a metallic cylindrical mixing drum, to thereby avoid added formation of entrapped hydrogen gas bubbles in the slurry. An approach to removing entrapped hydrogen gas bubbles from an anode slurry is disclosed in U.S. Pat. No. 5,632,603, which employs a deareation chamber made up of a vacuum pumping apparatus having a vertical conduit, a downwardly inclined conduit, and an upwardly extending conduit. The vacuum pumping apparatus is subjected to a vacuum such that a flow of slurry is caused to move through the vertical conduit while the vacuum pump causes entrapped gas bubbles within the slurry to be subjected to a reduced pressure and to expand and burst, thereby releasing the gas from the slurry through the upwardly extending conduit. This approach enables the continual transfer and densification of the slurry while simultaneously eliminating gas bubbles. The aforementioned prior art approach requires slurry flow through conduits and is intended to provide continuous flow of anode from anode manufacture to cell assembly. Prior anode degassing approaches may not remove a substantial amount of the air and hydrogen gas that may be generated due to zinc gassing. As a consequence, a substantial amount of entrapped air and hydrogen gas may remain entrapped in the anode slurry.

Accordingly, it is therefore desirable to remove a significant amount of the entrapped air and hydrogen gas created during zinc gassing from the anode mix for use in electrochemical cells. It is further desirable to obtain an increased density of the anode mix to enhance the service performance of electrochemical cells.

SUMMARY OF THE INVENTION

The present invention removes entrapped air and hydrogen gas from an anode mix, and thereby increases the density of the anode mix for use in batteries. To achieve this and other advantages, and in accordance with the purpose of the invention as embodied and described. herein, one aspect of the present invention provides for an anode degassing process for removing gas and densifying a slurry of anode mix. The anode degassing process comprises the steps of providing an anode mix, aging the anode mix for at least thirty minutes following manufacture of the anode mix, disposing the aged anode mix into a mixer, generating a vacuum in the mixer, and agitating the anode mix by mixing the anode mix in the presence of the vacuum to remove gas from the anode mix, thereby providing an increased density anode slurry.

According to another aspect of the present invention, an anode slurry is provided for use as an electrode in an alkaline electrochemical cell. The anode slurry comprises zinc, an alkaline electrolyte such as potassium hydroxide, and a binder. The anode slurry is aged for at least thirty minutes following manufacture and agitated in the presence of a vacuum to remove gas from the anode slurry to produce an anode slurry having a density of greater than 96 percent of the theoretical density of the anode.

According to yet a further aspect of the present invention, an anode degassing apparatus is provided for degassing a batch of anode mix to remove gas and thereby increase the anode density. The anode degassing apparatus comprises a container, and a vacuum pump for creating a vacuum within the container. Anode mix is aged for at least thirty minutes, and is then agitated, such as by a mixer, in the container in the presence of a vacuum to remove gas from the anode mix.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
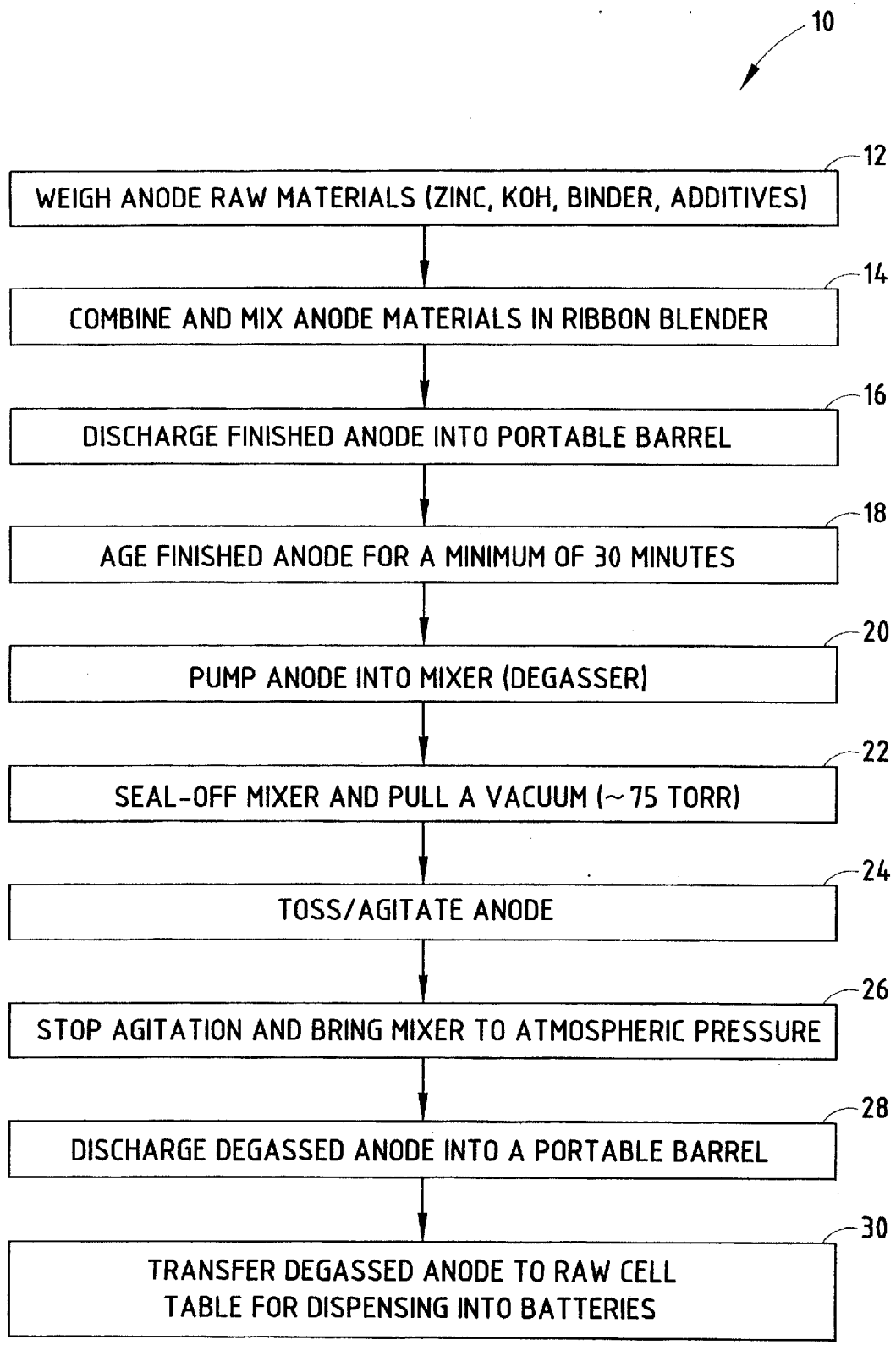
FIG. 1 is a flow diagram illustrating an anode degassing process for removing gas from a manufactured slurry of anode mix according to the present invention.

Referring to FIG. 1, an anode degassing process 10 is illustrated for degassing and densifying a batch of anode mix (slurry) to remove entrapped air and hydrogen gas and thereby increase the density of the anode mix prior to assembly in primary alkaline electrochemical cells (batteries). The anode degassing process 10 includes step 12 of weighing the anode raw materials to obtain predetermined amounts of anode materials to make a batch of anode mix according to an anode formulation. The anode raw materials preferably include zinc powder, alkaline electrolyte solution, gelling agent binder, and additives. The zinc powder may include bismuth indium aluminum (BIA) zinc, and typically is of an amount generally in the range of 60 to 75 percent of total anode weight, and more preferable in the range of 67 to 70 percent of total anode weight. The alkaline electrolyte solution may include potassium hydroxide (KOH) solution, typically in the range of 37 to 40 percent of the electrolyte solution weight. According to one example, the anode formulation may comprise 67.0 weight percent zinc powder, 0.50 weight percent gelling agent binder, and 32.50 weight percent alkaline electrolyte solution having 40 percent potassium hydroxide (KOH) and other additives.

The weighed raw materials are then combined together and mixed in a blender, such as a conventional ribbon blender, in step 14. Portions of the ribbon blender that contact the anode slurry may be coated with a chemically inert material to prevent undesirable chemical reaction. The mixing of the anode materials in a ribbon blender may include a conventional mixing operation which typically comprises blending the materials under atmospheric pressure conditions to achieve a uniform anode mixture. Once the anode materials are uniformly mixed at the anode manufacture station, the anode mix is thereafter discharged into a container, such as a portable barrel, in step 16. The portable barrel may include a mobile buggy that allows for the transportation of the bulk anode mix to a degassing station.

Following the anode manufacture, the finished anode mix is aged for a minimum time period of thirty minutes, in step 18. The aging step 18 occurs for a time period long enough to allow a substantial amount of the hydrogen gas, that is generated internally due to zinc corrosion reaction gassing, to be formed. The minimum aging time period generally may vary from thirty minutes to twenty-four hours, depending on the amount of hydrogen gas to be removed and the rate of zinc gassing, which may vary depending on the anode materials employed including the amount of zinc and potassium hydroxide. It should be appreciated that zinc gassing is greatest initially, and then dissipates as the zinc surface passivates. The semi-permeable film reduces the zinc corrosion reaction to a much lower constant rate. Accordingly, a substantial amount of hydrogen gas is created within the first thirty minutes to twenty-four hours.

Figure 2:
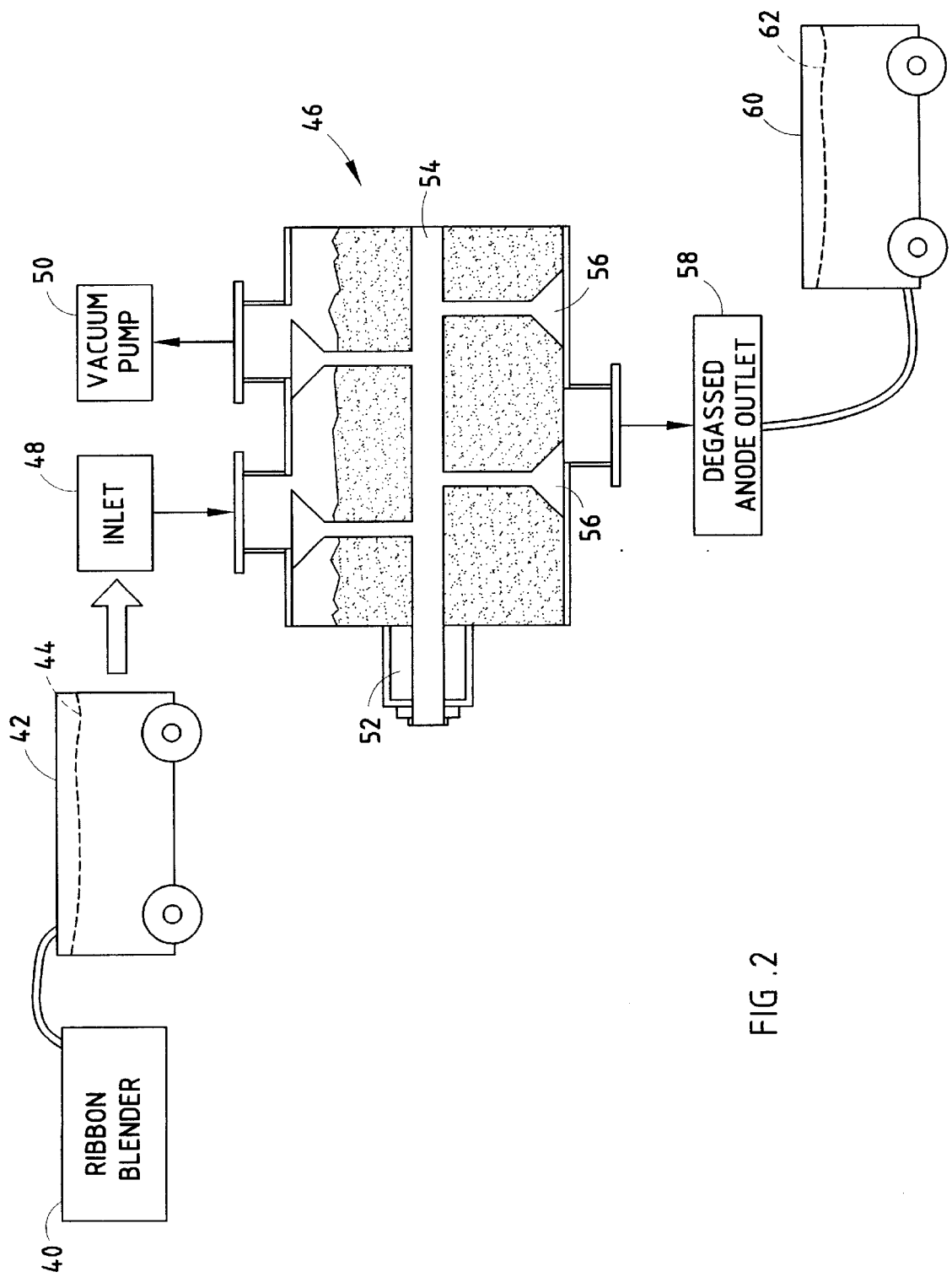
FIG. 2 is a schematic diagram illustrating the degassing of the anode slurry at various stages of the anode degassing process.

Following aging of the anode mix, the anode degassing process 10 proceeds to step 20 to pump the batch of anode mix into an anode degassing agitator, such as a mixer, to perform the anode degassing operation. The anode degassing mixer may include a blender operable in a container under subatmospheric pressure conditions (i.e., in the presence of a vacuum) and having agitation paddles as shown in FIG. 2. Once the anode mix is disposed in the anode degassing mixer, the anode degassing process 10 proceeds to step 22 to seal off the mixer container and to create a vacuum (subatmospheric pressure) via a vacuum pump. According to one example, the vacuum may be set to approximately 75 torr. The presence of a vacuum increases the size of the entrapped gas bubbles to further allow for their release from the anode slurry. Next, in step 24, the mixer is operated to toss/agitate the anode mix so as to bring the entrapped hydrogen gas and air to the surface where the gases are released from the anode mix. The released gases may then be removed from the mixer container via the vacuum pump. For the above example, in a vacuum at 75 torr, the mixing step 24 may last from five to thirty minutes. It should be appreciated that by removing the entrapped air and hydrogen gas, the density of the anode mixture is thereby increased to achieve an anode mix that offers enhanced service performance in electrochemical cells.

Once the agitation is complete in step 24, anode degassing process 10 proceeds to step 26 to stop the agitation and to bring the mixer back to atmospheric pressure. As an optional step, it should be appreciated that nitrogen gas may be injected into the degassing mixer both during and after the mixing steps so as to dilute the hydrogen gas that is removed from the anode mix to reduce the flammability of collected gases. In step 28, the degassed anode is discharged into a portable barrel, such as a portable buggy, and then in step 30, the degassed anode mix is transferred to a raw cell manufacturing table for dispensing into batteries in accordance with the battery manufacturing assembly.

Referring to FIG. 2, various stages of the anode degassing process are illustrated therein. Initially, the blended anode mix 44 is pumped from the ribbon blender 40 into portable buggy 42. The blended anode mix 44 is then dispensed into the inlet 48 of an anode degassing mixer 46. The degassing mixer 46 includes a vacuum pump 50 for creating a vacuum (subatmospheric pressure) within the degassing mixer 46. Degassing mixer 46 further includes a horizontal drive axle 54 driven by a motor 52 and connected to paddles 56. Paddles 56 are rotated about drive axle 54 within the mixer container to mix at low angular speed to toss/agitate the anode slurry so as to bring the entrapped air and hydrogen gas to the top surface, where it can be collected by the vacuum and sucked out of mixer 46 to the outside atmosphere. Mixing paddles 56 preferably include a non-corrosive inert material and/or coating such as rubber. Likewise, the inside of the anode degassing mixer 46 is preferably coated with a non-corrosive inert material, such as rubber, so that the zinc powder does not experience further corrosion which would unnecessarily generate additional hydrogen gassing. While paddles 56 are shown, it should be appreciated that agitators such as a plow-type agitator may be employed to mix a batch of anode slurry for degassing.

Once the anode slurry is completely mixed for a prescribed time period in the degassing mixer 46, the vacuum is removed and the degassing mixer 46 is exposed to atmospheric pressure. The degassed and densified anode mixture 62 is then transferred from degassing mixer 46 through outlet 58 and into a portable buggy 60. Anode mixture 62 is preferably transferred into buggy 60 through an inlet located at or near the bottom of buggy 60 so as to prevent splattering of the degassed anode slurry. The portable buggy 60 then transports the degassed anode slurry to a battery assembly station, where it is transferred into electrochemical cells.

It should be appreciated that the anode degassing process of the present invention advantageously increases the density of the anode mix. According to one example, the anode degassing process of the present invention increases the anode density by at least two percent. Accordingly, the anode degassing process 10 achieves an anode mix having a density of greater than 96 percent of the theoretical density of the anode mix prior to assembly in electrochemical cells. The theoretical density of the anode mix is determinable based on the sum total weight and volume of the individual components of the anode mix. According to one example of an anode formulation, the theoretical density can be determined as shown in the following table:

|  | Weight (g) | Volume (cc) | Theoretical Density (g/cc) |
| --- | --- | --- | --- |
| Zinc | 67.00 | 9.40 | 7.13 |
| Gelling Agent | 0.50 | 0.36 | 1.40 |
| Electrolyte Solution | 32.50 | 23.21 | 1.40 |
| Total | 100 g | 32.97 cc |  |

Anode Theoretical Density [100 g/32.97 cc] = 3.03 g/cc

According to the above example, the theoretical density of the anode is equal to the sum total weight (100 grams) of the individual components divided by the sum total of volume (32.97 cc) of the individual components which equals a theoretical density of 3.03 grams/cc. Accordingly, a measured volume (cc) of degassed anode mix can be weighed (g) to determine a measured anode density (g/cc) which can then be compared to the theoretical density to determine the percent of theoretical density of the anode.

Accordingly, the anode degassing process of the present invention advantageously provides for increased anode density which, in turn, provides enhanced battery service performance. The battery service increase is generally attributed to the increased anode conductivity due to the reduction in air pockets, as well as allowing for more anode weight for a given volume which leads to lower anode column height and increased cell design flexibility.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An anode degassing process for removing gas to densify a slurry of anode mix, said process comprising the steps of:
   providing an anode mix;
   disposing the anode mix into a mixer at least thirty minutes following manufacture of the anode mix;
   generating a vacuum in said mixer;
   agitating the anode mix by mixing the anode mix in the mixer in the presence of the vacuum to remove gas from the anode mix and produce a densified anode mix; and
   stopping the agitation and subsequently removing the vacuum to bring the agitated anode mix to atmospheric pressure.

2. The process as defined in claim 1 further comprising the step of discharging the degassed anode mix to a battery assembly station.

3. The process as defined in claim 1, wherein said agitation occurs for a time period in the range of five to thirty minutes.

4. The process as defined in claim 1, wherein said degassed anode mix has a density of greater than 96 percent of theoretical density of the anode.

5. An anode degassing process for removing gas to densify a slurry of anode mix, said process comprising the steps of:
   providing an anode mix comprising zinc, potassium hydroxide, and binder;
   disposing the anode mix into a mixer at least thirty minutes following manufacture of the anode mix;
   generating a vacuum in said mixer; and
   agitating the anode mix by mixing the anode mix in the mixer in the presence of the vacuum to remove gas from the anode mix and produce a densified anode mix.

6. An anode degassing process for removing gas to densify a slurry of anode mix, said process comprising the steps of:
   providing an anode mix;
   disposing the anode mix into a mixer at least thirty minutes following manufacture of the anode mix wherein said mixer comprises a blender disposed in a vacuum sealed container;
   generating a vacuum in said mixer; and
   agitating the anode mix by mixing the anode mix in the mixer in the presence of the vacuum to remove gas from the anode mix and produce a densified anode mix.

7. An anode slurry for use as an electrode in an alkaline electrochemical cell, said anode slurry comprising zinc, an alkaline electrolyte comprising potassium hydroxide, and a binder, wherein at least thirty minutes following manufacture said anode slurry is then agitated in the presence of a vacuum to remove gas from the anode slurry to produce an anode slurry having a density of greater than 96 percent of the theoretical density of the anode slurry.

8. The anode slurry as defined in claim 7, wherein said zinc is in the range of 60 to 75 percent of the total anode weight.

9. The anode slurry as defined in claim 8, wherein said zinc is in the range of 67 to 70 percent of the total anode weight.

10. The anode slurry as defined in claim 7, wherein said anode slurry is degassed by mixing in a mixer with a vacuum to remove gas from the anode slurry.

* * * * *